United States Patent

[11] 3,588,702

[72] Inventors Felix D. Tisi
Zuerich;
Peter Leuthold, Neuhausen Rheinfall,
Switzerland

[21] Appl. No. 786,111
[22] Filed Dec. 23, 1968
[45] Patented June 28, 1971
[73] Assignee U. S. Philips Corporation
New York, N.Y.
[32] Priority Jan. 13, 1968
[33] Netherlands
[31] 6,800,578

[54] TRANSMITTER FOR SINGLE SIDEBAND TRANSMISSION BIVALENT OF PULSE
8 Claims, 12 Drawing Figs.

[52] U.S. Cl. .......... 325/38, 178/68, 325/40, 325/49, 325/59, 325/137
[51] Int. Cl. .......... H03k 7/00, H04l 27/04
[50] Field of Search .......... 178/66, 68, 69; 328/13, 21, 26, 28; 332/9, 10; 325/38, 39, 40, 41, 42, 59, 60, 61, 49, 38 (A)

[56] References Cited

UNITED STATES PATENTS

| | | | |
|---|---|---|---|
| 3,423,529 | 1/1969 | O'Neill, Jr. .......... | 178/68 |
| 3,456,199 | 7/1969 | Van Gerwen .......... | 328/36 |

*Primary Examiner*—Robert L. Griffin
*Assistant Examiner*—Benedict V. Safourek
*Attorney*—Frank R. Trifari

ABSTRACT: Binary information is transmitted as a single sideband signal to a receiving station. The binary signal is first converted to a three level signal. Phase quadrative versions of this three level signal are produced by using two modulators supplied with 90 relative phase shifted versions of a carrier equal to one quarter of the binary pulse frequency. The phase shifted versions of the three level signal are then each modulated on phase quadrature versions of the transmission frequency carries and combined for transmission as a single sideband signal. The two carriers are transmitted as a pilot.

Figure 1:
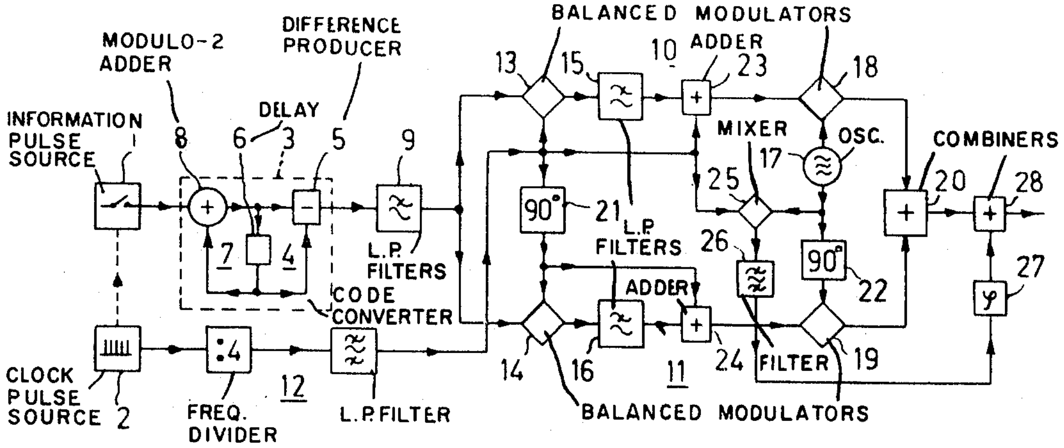
Figure 2A:
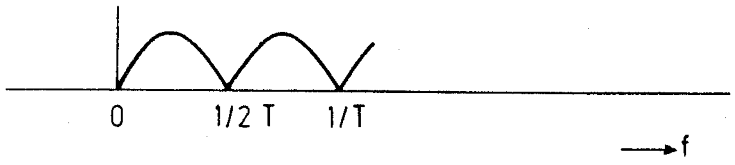
Figure 2B:
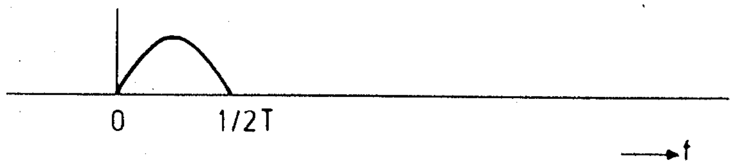
Figure 2C:
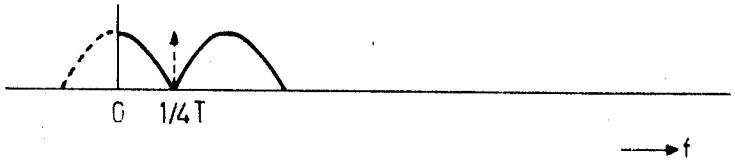
Figure 2D:
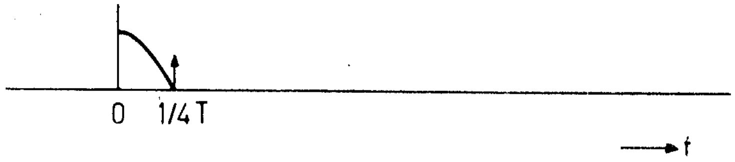
Figure 2E:
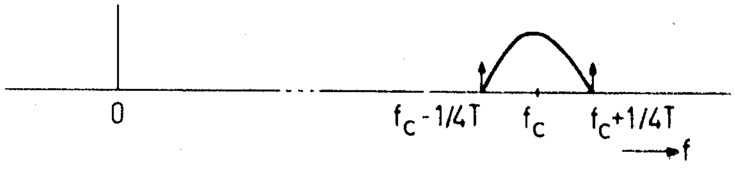

INVENTORS
FELIX D. TISI
BY PETER LEUTHOLD
Frank R. Trifari
AGENT

INVENTORS
FELIX D. TISI
BY PETER LEUTHOLD

Frank R. Jeifani
AGENT

TRANSMITTER FOR SINGLE SIDEBAND TRANSMISSION BIVALENT OF PULSE

A prior U.S. Pat. application No. 532,744 filed Mar. 8, 1966 describes a transmission device in a transmission system for the transmission of information signals which are formed by bivalent pulses the instants of occurrence of which coincide with a series of equidistant clock pulses in which transmission device the pulses are applied to an amplitude modulator device and associated carrier oscillator, the transmission device furthermore being provided with a transmission network which has a transmission characteristic corresponding to that of a difference producer to which the input signal is applied directly on the one hand and through a delay element on the other hand, and in which a single sideband filter is connected to the output of the amplitude modulator device which filter together with the transmission network passes exclusively one of the two sideband signals occurring at the output of the amplitude modulator device, while at least one pilot signal is cotransmitted with the output signals to be transmitted of the amplitude modulator device.

As has extensively been described in the main application a transmission device for the transmission of pulses is thus obtained in which, with extreme simplicity of equipment, the transmission speed which is possible for certain frequency band is increased to a maximum.

An object of the invention is to provide a transmission device of the kind described in which the cutoff frequency of the single sideband filter is independent of the frequency location of the single sideband signal to be transmitted at the output of the transmission device and which cutoff frequency is exclusively determined by the transmission speed so that the construction of the single sideband filter is considerably simplified and the transmission device is particularly suitable for construction as an integrated circuit.

According to the invention the transmission device is characterized in that it includes a plurality of channels to which the pulses are applied in a parallel arrangement, each channel being provided with an amplitude modulator connected to a common carrier oscillator, in which amplitude modulators the pulses are modulated on carrier oscillations having a common frequency which is equal to one quarter of the clock pulse frequency and having a phase shift which is different for each channel, a single sideband filter in the form of a low-pass filter being connected to the output of each amplitude modulator, the cutoff frequency of said filter being slightly higher than one quarter of the clock pulse frequency, each channel furthermore being provided with a second amplitude modulator likewise connected to a common carrier oscillator, in which second amplitude modulators the signals derived from the single sideband filters are modulated on carrier oscillations having a common frequency and a phase shift which is equal to the phase shift of the carrier oscillation for the first amplitude modulator in the relevant channel, the outputs of the second amplitude modulators being connected to a combination device from which the single sideband signal to be transmitted is derived.

Figure 3:
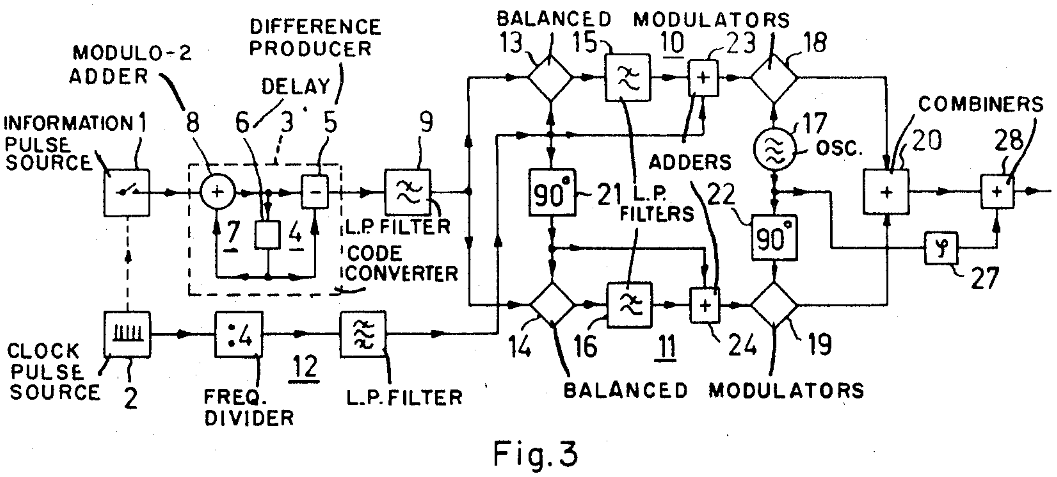
Figure 4A:
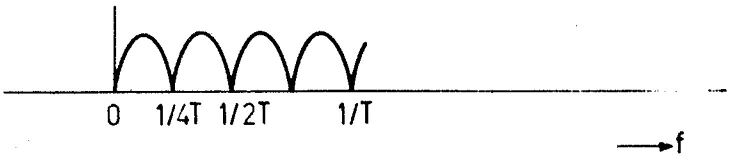
Figure 4B:
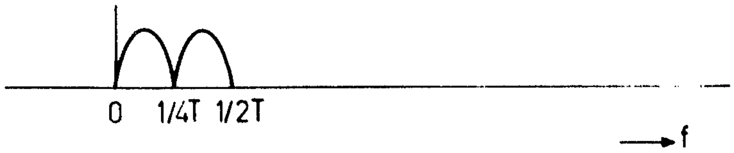
Figure 4C:
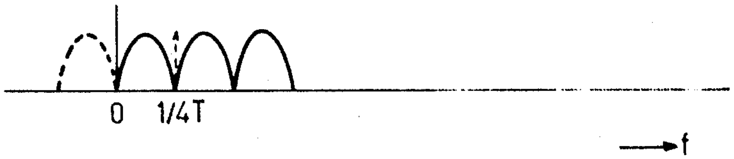
Figure 4D:
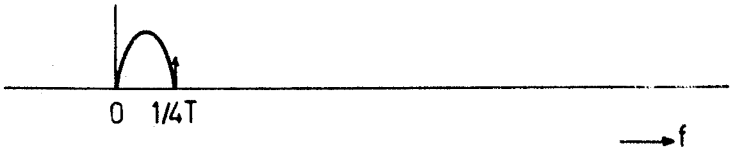
Figure 4E:
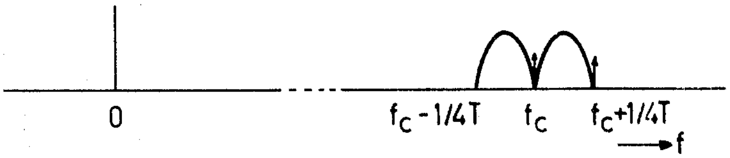

In order that the invention may be readily carried into effect it will now be described in detail by way of example with reference to the accompanying diagrammatic drawings in which:

FIG. 1 shows a transmission device according to the invention;

FIGS. 2*a*—2*e* show a few frequency characteristics to explain the transmission device of FIG. 1;

FIG. 3 shows a modification of the transmission device of FIG. 1;

FIGS. 4*a*—4*e* show a few frequency characteristics to explain the transmission device of FIG. 3.

The transmission device of FIG. 1 according to the invention is equipped to transmit information signals through a telephony connection at a given bandwidth of, for example, 4 kc./s. which signals are formed by bivalent pulses originating from a pulse source 1 the instants of occurrence of which coincide with a series of equidistant clock pulses, for example, originating from a clock pulse generator 2. The transmission speed of the bivalent pulses is, for example, 4000 Baud, which corresponds to a clock pulse frequency of 4 kc./s.

The bivalent pulses in the transmission device described are transmitted by means of single sideband amplitude modulation with carrier suppressing and permitting of synchronous detection at the receiver end. The main application extensively describes the manner in which this method of modulation is made possible by modifying the frequency spectrum of the bivalent pulses and in which manner the original bivalent pulses at the receiver end can be recovered with the aid of a simple full-wave rectification by using a pulse transformation prior to this spectrum modification. To this end the pulses originating from pulse source 1 in the transmission device are applied to a code converter 3 which is provided with a transmission network 4 which brings about the desired spectrum modification and which has the form of a difference producer 5 to which the pulses are directly applied on the one hand and through a delay element 6 on the other hand, while a pulse transformation device 7 preceding the transmission network 4 is included in the code converter 3 which transformation device brings about the pulse transformation associated with the spectrum modification and which has the form of a modulo-2-adder 8 to which the pulses from pulse source 1 are applied on the one hand and the output pulses of the pulse transformation device 7 delayed through the delay element 6 on the other hand. The output pulses of the code converter are passed on to a low-pass filter 9 the cutoff frequency of which is slightly higher than half the clock pulse frequency, for example, 2.1 kc./s.

As has been described in the main application the pulsatory output signal of the low-pass filter 9 is modulated on a carrier oscillation in an amplitude modulator device with carrier suppressing and for further transmission exclusively one of the sideband signals occurring at the output of the amplitude modulator device is passed by a single sideband filter at the output of the amplitude modulator device in cooperation with the transmission network 4, while pilot signals are cotransmitted with the single sideband signal to be transmitted in order to be able to faithfully restore the carrier oscillation and the clock pulses at the receiver end.

To considerably simplify the single sideband filter used the transmission device according to the invention includes a plurality of channels 10, 11 to which the pulses are applied in a parallel arrangement, each channel 10, 11 being provided with amplitude modulators 13, 14 connected to a common carrier oscillator 12, in which amplitude modulators 13, 14 the pulses are modulated on carrier oscillations having a common frequency which is equal to one quarter of the clock pulse frequency and having a phase shift which is different for each channel 10, 11, single sideband filters 15, 16 in the form of low-pass filters being connected to the outputs of the amplitude modulators 13, 14, the cutoff frequency of said filters being slightly higher than a quarter of the clock pulse frequency, while each channel 10, 11 is furthermore provided with second amplitude modulators 18, 19 likewise connected to a common carrier oscillator 17, in which second amplitude modulators 18, 19 the signals derived from the single sideband filters 15, 16 are modulated on carrier oscillations having a common frequency and a phase shift which is equal to the phase shift of the carrier oscillation of the first amplitude modulators 13, 14 in the relevant channels 10, 11 the outputs of the second amplitude modulators 18, 19 being connected to a combination device 20 from which the single sideband signal to be transmitted is derived.

In the embodiment shown wherein the number of channels 10, 11 is two, the phase shift of the carrier oscillations between the channels is 90° which phase shift is effected with the aid of a 90° phase-shifting network 21 for the first amplitude modulators 13, 14 and with the aid of a 90° phase-shifting network 22 for the second amplitude modulators 18, 19. The carrier oscillator 12 for the first amplitude modulators 13, 14 is formed by a frequency divider connected to the clock pulse generator 2 and having a division factor of 4 followed by a selection filter, which carrier oscillator 12 thus supplies carrier oscillations at a frequency of 1 kc./s., while the cutoff frequency of the single sideband filters 15, 16 is slightly higher than 1 kc./s. The carrier frequency of the carrier oscillator 17 is, for example, 62 kc./s. The amplitude modulators 13, 14, 18, 19 are constructed as push-pull modulators, for example, ring modulators. Furthermore, the channels 10, 11 include combination devices 23, 24 in series with the single sideband filters 15, 16 in which combination device a pilot signal the frequency of which is equal to one quarter of the clock pulse frequency and thus in this case is equal to 1 kc./s. is combined at a suitable chosen level with the output signals of the amplitude modulators 13, 14. A pilot signal which is obtained, for example, by mixing the second carrier frequency of 62 kc./s. with the first carrier frequency of 1 kc./s. in a mixer stage 25 with associated selection filter 26 is combined, after suitable phase adjustment in a phase-shifting network 27, at a suitably chosen level in an adder 28 with the single sideband signal occurring at the output of the combination device 20. The carrier frequency of 62 kc./s. for the synchronous detection and the clock pulse frequency of 4 kc./s. for the regeneration of the bivalent pulses can be recovered from these two pilot signals at the receiver end.

The code converter 3 used in the transmission device is of a type which is more generally described in prior U.S. Pat. No. 3,456,199 in which it is stated that for a delay time NT of the delay element 6, wherein N is larger than 1 and T is equal to the clock pulse period, the transmission characteristic of the transmission network 4 has zero's for the frequencies $f$=0 and $f$=$k$NT wherein $k$=1, 2, 3 ..., while the preceding pulse transformation device 7 then brings about the required pulse transformation so that the original bivalent pulses can simply be recovered at the receiver end by full-wave rectification.

In the transmission device of FIG. 1 the delay time of delay element 6 is chosen to be 2T, the clock pulse period T in the relevant case being 0.25 msec. and zero's occurring in the transmission characteristic for the frequencies $f$=0, $f$=½T, $f$=1T, $f$=3/2T,.... etc.

The operation of the transmission device of FIG. 1 will now further be described with reference to the frequency characteristics of FIG. 2.

In FIG. 2$a$ shows the amplitude frequency characteristic of the transmission network 4. Under influence of this transmission characteristic the DC component and the components of the pulse spectrum at regular frequency distances 1/2T are suppressed. The suppression of the spectrum components at the frequency $f$=1/2T simplifies the construction of low-pass filter 9 by means of which, as usual, the spectrum components above half the clock frequency $f$=1/2T are suppressed. The transmission characteristic of code converter 3 and low-pass filter 9 in series therewith is shown in FIG. 2 at $b$. The output signal of the low-pass filter 9 at a bandwidth of 1/2T and with suppressed spectrum components at the frequencies $f$=0 and $f$=1/a-T is applied in a parallel arrangement to the channels 10, 11 and is modulated on carrier oscillations in the amplitude modulators 13, 14 with carrier suppressing, which oscillations have a frequency $f$=1/4T which is equal to the central frequency of the output signal of the low-pass filter 9 and a mutual phase difference of 90°. As is shown at $c$ in FIG. 2 two sidebands arise in this modulation process on either side of the carrier frequency $f$=1/4T, half the lower sideband occurring in lower sideband location in the frequency band of from $f$=0 to $f$=1/a-T and the other half of this lower sideband (shown in a broken line in FIG. 2$c$) likewise occurring in the frequency band of from $f$=0 to $f$=1/4T, but now in upper sideband location due to the fold over of the frequency spectrum at the frequency $f$=0. The upper sideband of the output signal of the amplitude modulators 13, 14 is suppressed with the aid of the single sideband filters 15, 16 formed by low-pass filters the cutoff frequency of which is located at $f$=1/4T so that after addition of the pilot signals at the frequency $f$=1/4T to the outputs of the combination devices 23, 24 a composite signal occurs which consists of the two halves of the lower sideband, one in lower sideband location and the other in upper sideband location and the bandwidth of which is 1/4T as is shown at $d$ in FIG. 2.

If these composite signals derived from the combination devices 23, 24 are modulated, in the two amplitude modulators 18, 19 with carrier suppressing, on carrier oscillations at a frequency $f_c$=kc./s. and at a mutual phase difference of 90°, sidebands arise at the outputs of the amplitude modulators 18, 19 on either side of the carrier frequency $f_c$ which sidebands each correspond separately to the composite signal at $d$ in FIG. 2 which two sideband signals together form two overlapping single sideband signals of the signal shown at $b$ in FIG. 2 in the frequency band from $f_c$=1/4T to $f_c$+1/4T, one signal in lower sideband location and the other in upper sideband location. These single sideband signals which are located in the same frequency band then occur with a mutually equal phase at the amplitude modulator 18 and with a mutually opposite phase at the amplitude modulator 19. Addition of these output signals at the amplitude modulators 18, 19 in the combination device 20 then results in a normal single sideband signal in the frequency band from $f_c$−1/4T to $f_c$+1/4T in lower sideband location and accompanied by a pilot signal at a frequency of $f_c$+14T. The other pilot signal at a frequency of $f_c$−1/4T is now obtained with the aid of the mixer stage 25 and the selection filter 26 and is added in the adder 28 to the single sideband signal so that the output signal of the transmission device has the frequency characteristic shown at $e$ in FIG. 2.

For completeness' sake it is noted that subtraction of the output signals at the amplitude modulators 18, 19 in the combination device 20 likewise results in a normal single sideband signal in the same frequency band, but now in upper sideband location and accompanied by a pilot signal having a frequency of $f_c$−1/4T, the pilot signal having a frequency of $f_c$+1/4T being obtained by mixing in a similar manner.

A single sideband signal in the frequency band from $f_c$−1/4T is obtained in this manner in the transmission device according to the invention in which in addition to simplicity of construction due to the suppression of the spectrum components near the cutoff frequency (compare $c$ and $d$ in FIG. 2) the required single sideband filters 15, 16 have the additional considerable advantage of a cutoff frequency of $f$=1/4T which is independent on the ultimate frequency location of the single sideband signal around the carrier frequency $f_c$ of the carrier oscillator 17 and which is exclusively determined by the transmission speed of the bivalent pulses to be transmitted and originating from the pulse source 1. Due to this simplicity of the single sideband filters 15, 16 formed by low-pass filters the transmission device is eminently suitable for construction as an integrated circuit.

An interesting modification of the transmission device of FIG. 1 is shown in FIG. 3 in which corresponding elements of FIGS. 1 and 3 are indicated by the same reference numerals.

The transmission device of FIG. 3 differs from that of FIG. 1 in that the delay time of the delay element 6 is chosen to be 4T so that the transmission characteristic of the transmission network 4 illustrated in FIG. 4$a$ now has zero's at the frequencies $f$=0, $f$=1/4T, $f$=1/2T, $f$=3/4T, $f$=1/T,... etc. As a result not only the spectrum components at the frequencies $f$=0 and $f$=1/2T but also the spectrum components at the frequency $f$=1/4T are suppressed in the output signal of the low-pass filter 9 as is shown by the frequency characteristic at $b$ in FIG. 4. In the same manner as in the transmission device of FIG. 1 modulation of this output signal on the carrier oscillations having a frequency of $f$=1/4T in the amplitude modulators 13, 14 then results in a modulated signal having a spectrum shown at $c$ in FIG. 4 and giving rise to a composite signal having a spectrum shown at $d$ in FIG. 4 after suppression of the components above the frequency $f$=1/4T by means of the single sideband filters 15, 16 and after addition of the pilot signals of the frequency $f$=1/4T, while modulation of this composite signal on the carrier oscillations at the frequency $f_c$ in the amplitude modulators 18, 19 and addition of the modulated signals in the combination device 20 finally results in the single sideband signal in the frequency band from $f_c$−1/4T to $f_c$+1/4T in lower sideband location and accompanied by a pilot signal of the frequency $f_c$+1/4T, to which signals a pilot signal of the frequency $f_c$ may be added in this case.

The suppression of components in the pulse spectrum at the frequency $f$=1/4T occurring in the transmission device of FIG. 3 provides the advantage that the amplitude modulators 13, 18 in channel 10 and the amplitude modulators 14, 19 in channel 11 are decoupled for direct current on the one hand (compare *d* in FIG. 4 and *d* in FIG. 2) while the spectrum components at the carrier frequency $f_c$ are absent in the single sideband signal at the output of the combination device 20 on the other hand (compare *e* in FIG. 4 and *e* in FIG. 2) so that a pilot signal for recovering the carrier frequency $f_c$ may directly be added to the single sideband signal without mixing it with another pilot signal.

The number of channels 10, 11 which is two in the transmission devices described so far may be extended without difficulty to *m* for *m*=3, 4, 5, ...., in which the phase shifts in each channel are the same for the two carrier oscillations at the frequencies $f$=1/4T and $f$=$f_c$ and for the subsequent channels always increase by an amount of $q \cdot 180°$ *m* wherein *q* *m* and *q*=1, 2, 3, ,,, , for example, when *q*=1 and *m*=3 the said phase shift for the first channel is 0°, for the second channel 60° and for the third channel 120°. Addition of the modulated signals of the *m* channels in the combination device 20 then results in a single sideband signal in lower sideband location. An advantage of the extension of the number of channels is that small crrors in the phase shifts for the channels become less important as the number of channels increases.

It is to be noted that in the transmission device of FIG. 1 the two pilot signals of the frequencies $f_c$−1/4T and $f_c$+1/4T can alternatively be obtained by applying a pilot signal of the frequency $f$=1/4T to only one channel, for example, channel 10 so that the combination device 24 in the other channel 11 and the mixer stage 25, the selection filter 26, the phase-shifting network 27 and the adder 28 may be omitted. The symmetrical embodiment shown in FIG. 1 is however, to be preferred for practical reasons.

It is furthermore to be noted that the single sideband signal occurring at the output of the transmission device can alternatively be demodulated in known manner with the aid of a carrier oscillation of the frequency $f_c$−1/4T or $f_c$+1/4T, dependent on its frequency location.

I claim:

1. A device for transmitting bivalent information pulses of a selected clock frequency comprising a network including a delay element and a difference producer coupled to said delay element, said network coupled to receive said information pulses; a plurality of channels coupled to said information filter, each of said channels comprising the serial coupling in the order recited of a first amplitude modulator, a channel low-pass filter having a cutoff frequency slightly higher than one quarter of the clock frequency, and a second amplitude modulator; a source of a first carrier signal having a frequency substantially equal to one quarter of said clock frequency; means for applying said first carrier signal to said first amplitude modulators with phase shifts between all of said applied signals; a source of a second carrier signal; means for applying said second carrier signal to said second amplitude modulators with phase shifts between all of said applied signals substantially equal to said phase shifts in said first carrier signals applied to said first modulators in the respective channel; means for combining the outputs of said channels; and means for transmitting at least one pilot signal with said combined output signals.

2. A device as claimed in claim 1 wherein the delay time of said delay element is substantially equal to twice the clock frequency.

3. A device as claimed in claim 1 wherein the delay time of said delay element is substantially equal to four times the clock frequency.

4. A device as claimed in claim 1 wherein said transmitting means comprise a plurality of combination means located between said channel filters and said second amplitude modulators within each of said channels respectively, each of said combination means being coupled to receive said respective phase shifted first carrier signals.

5. A device as claimed in claim 1 wherein said transmitting means comprise means for mixing said first and second carrier signals and means for adding the mixing means output signal to said combined channel output signals.

6. A device as claimed in claim 1 wherein said transmitting means comprise means for adding said second carrier signal to the combined channel output signals.

7. A device as claimed in claim 1 wherein said transmitting means comprise an adding means located in one of said channels between said channel filter and said second amplitude modulator, said adding means being coupled to receive the respective phase shifted first carrier signal.

8. A device as claimed in claim 1 wherein both of said phase shift applying means cause a phase shift per channel equal to 180° divided by the number of channels.